No. 631,437. Patented Aug. 22, 1899.
R. H. PLASS.
SELF PROPELLING VEHICLE.
(Application filed Jan. 9, 1899.)
(No Model.) 3 Sheets—Sheet 1.

Witnesses:
A. M. E. Kennedy
Arthur Ashley

Inventor:
R. H. Plass
B. M. R. Kennedy Atty.

THE NORRIS PETERS CO., PHOTO-LITHO., WASHINGTON, D. C.

No. 631,437. Patented Aug. 22, 1899.
R. H. PLASS.
SELF PROPELLING VEHICLE.
(Application filed Jan. 9, 1899.)
(No Model.) 3 Sheets—Sheet 2.
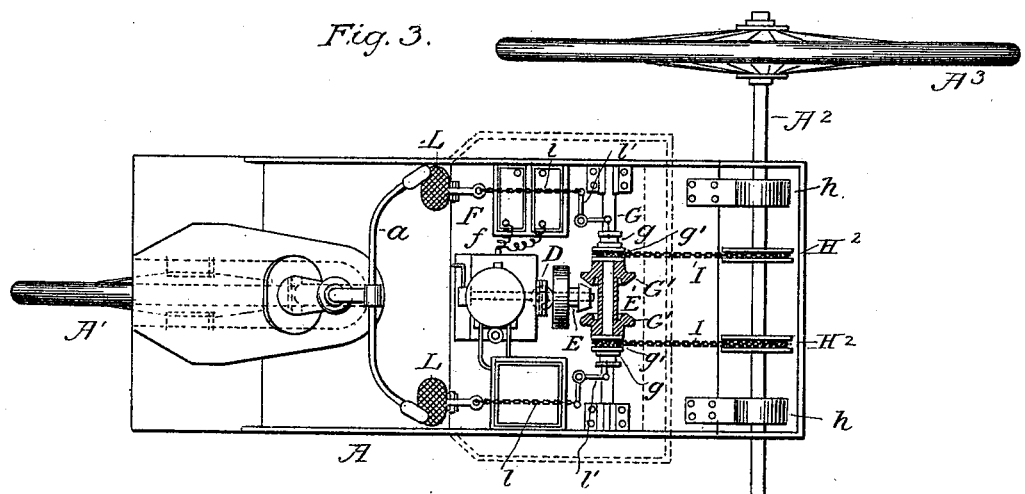
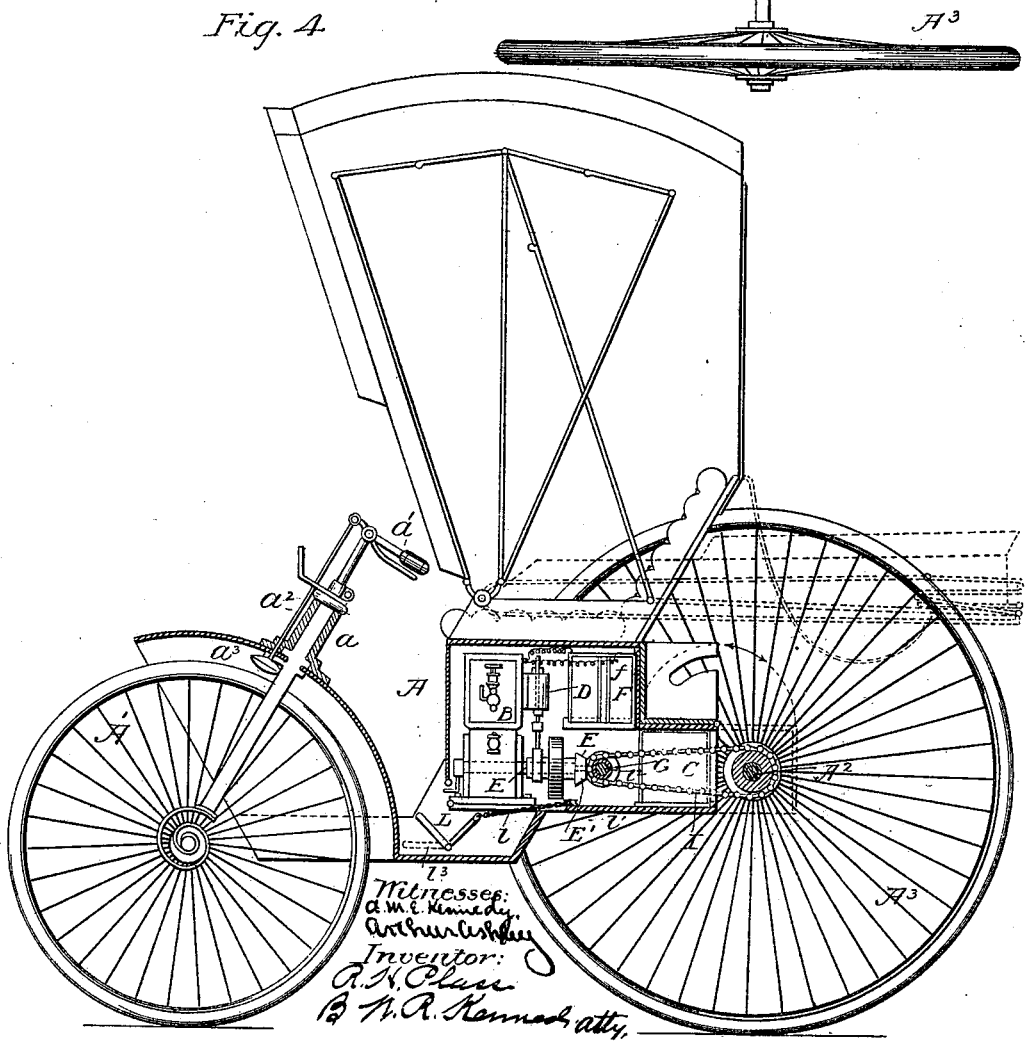

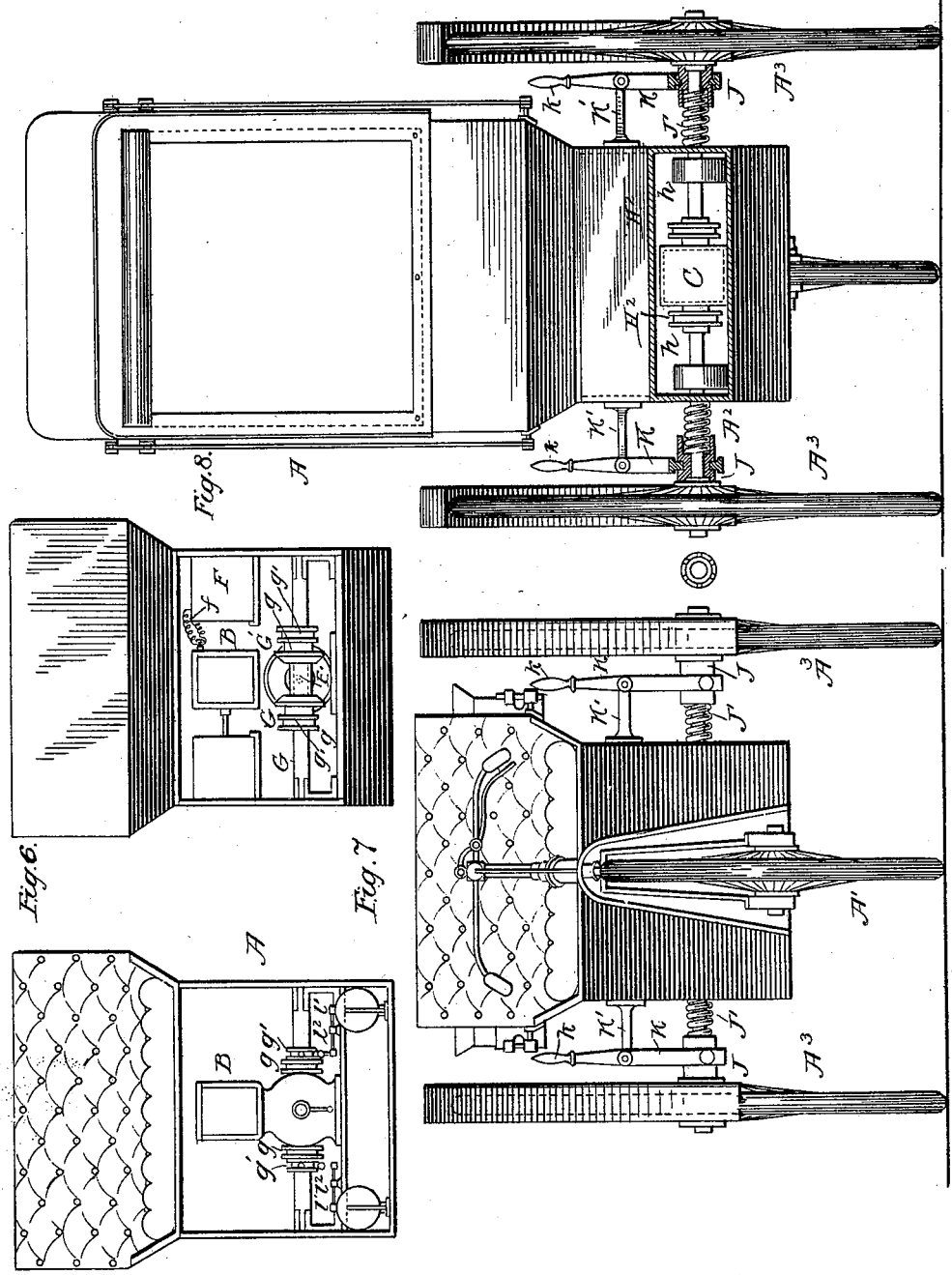

UNITED STATES PATENT OFFICE.

REUBEN H. PLASS, OF NEW YORK, N. Y., ASSIGNOR TO ISABELLA C. PLASS, OF SAME PLACE.

SELF-PROPELLING VEHICLE.

SPECIFICATION forming part of Letters Patent No. 631,437, dated August 22, 1899.

Application filed January 9, 1899. Serial No. 701,643. (No model.)

*To all whom it may concern:*

Be it known that I, REUBEN H. PLASS, a citizen of the United States, residing at New York, (Brooklyn,) in the county of Kings and State of New York, have invented certain new and useful Improvements in Self-Propelling Vehicles; and I do hereby declare the following to be a full, clear, and exact description of the invention, such as will enable others skilled in the art to which it appertains to make and use the same.

This invention relates to self-propelling vehicles.

The object of the invention is to produce a self-propelling vehicle which shall be so constructed as to be capable of being guided with ease, shall be adapted for making sharp turns or going around sharp corners without dragging or cramping of the wheels, and which can be run by an unskilled person without danger.

With these objects in view the invention consists, essentially, of a vehicle of the kind described, comprising an engine having its shaft provided with a friction-head, a shaft having two friction-wheels arranged thereon on opposite sides of the friction-head, the friction-wheels being capable of sliding toward and away from the friction-head, an axle connected to the shaft, two wheels loosely mounted on the shaft, clutches for connecting the wheels to the axle, and levers connected to the clutch and extending to points adjacent to the side of the vehicle.

The invention is illustrated in the accompanying drawings, in which—

Figure 1:
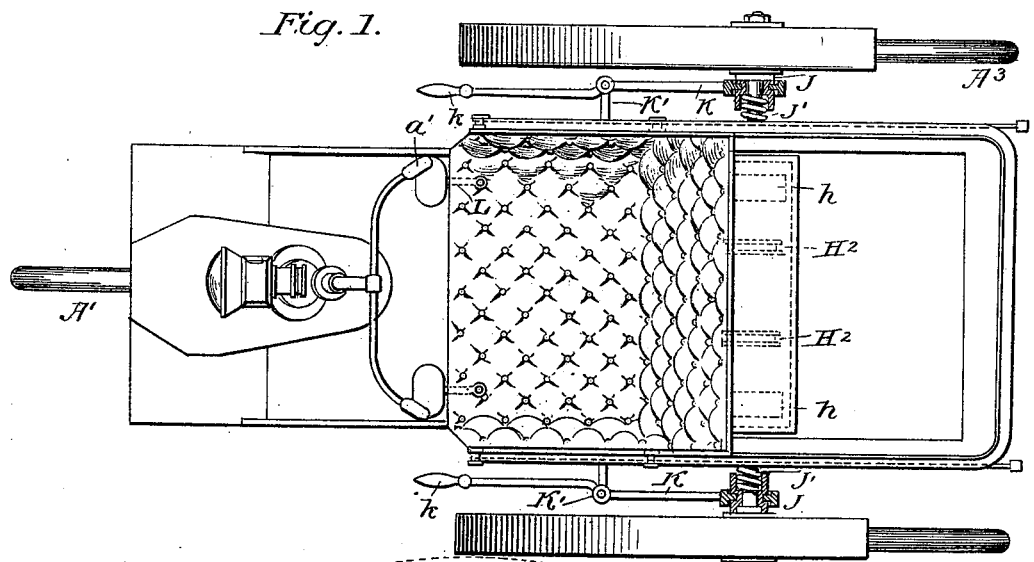
Figure 2:
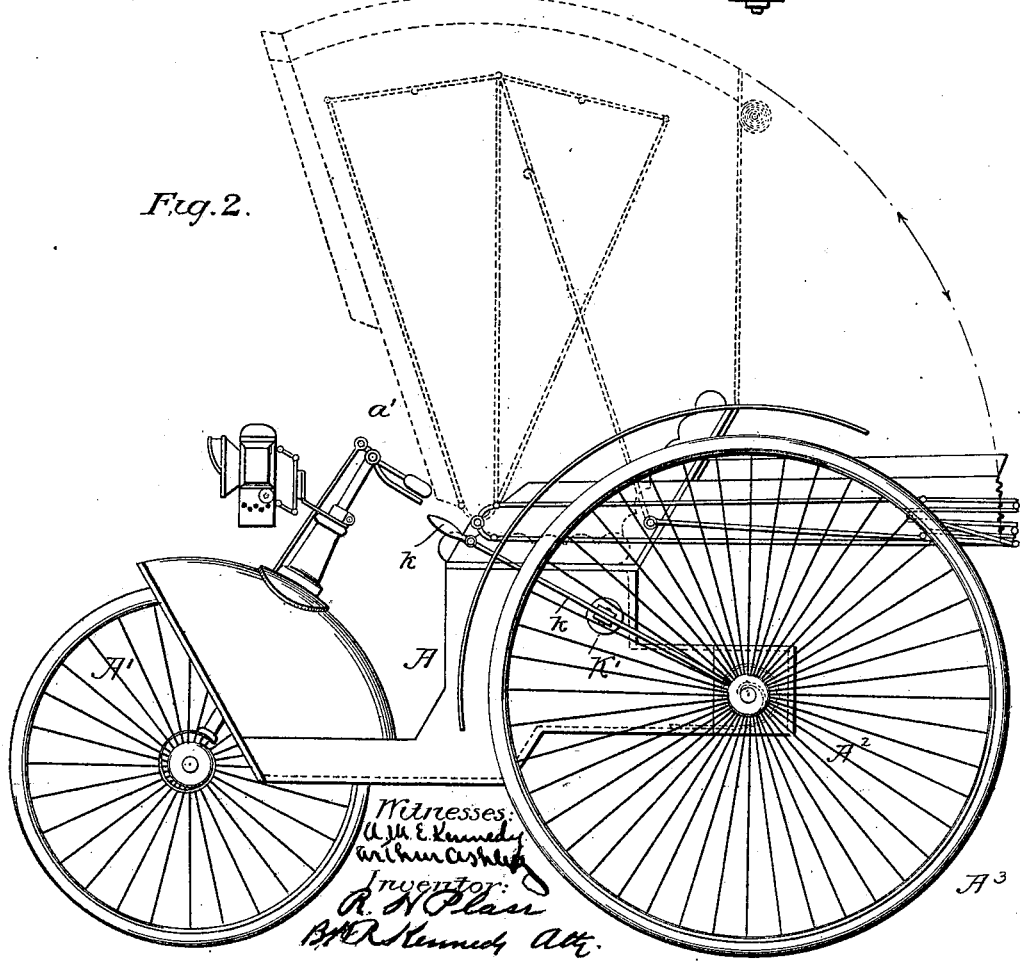

Figure 1 is a plan view of a vehicle constructed in accordance with my invention. Fig. 2 is a side elevation. Fig. 3 is a plan view, the seat being removed. Fig. 4 is a side view, the side of the body being broken away. Fig. 5 is a transverse sectional view, particularly showing the means for operating the connection between the engine and the axle of the driving-wheels of the vehicle. Fig. 6 is a transverse sectional view, particularly showing the relative positions of the engine, the tank containing water for circulation around the engine, and the battery for exploding the charges of the engine. Fig. 7 is a front view of the vehicle; and Fig. 8 is a rear view, the clutches for connecting the rear wheels to the axle being shown in section.

In the drawings, A represents the body of the vehicle, which is, as shown, provided with a front wheel $A'$, mounted on a rod capable of rotating in suitable bearings in the front of the body, and with a rear axle $A^2$, fixed to the body and having thereon supporting-wheels $A^3$ $A^3$.

The front wheel $A'$ is mounted on a rod $a$, and it has attached to its upper end a handle-bar $a'$, adjacent to one handle of which is placed the brake-lever, which operates the reciprocating brake-rod $a^2$, having a shoe $a^3$, designed to bear on the upper face of the wheel $A'$.

Suitably arranged beneath the seat of the vehicle and attached to the floor thereof is an engine B, which is preferably of the well-known naphtha type. A tank C for containing naphtha is connected by a pipe $c$ with a pump D, and the pump is operated by an eccentric on the shaft E of the engine to inject charges of naphtha into the engine. The spark necessary to explode the charges is provided by a current of electricity conducted from a battery F to the engine by conductors $f\,f$.

The rear end of the main shaft E of the engine is provided with a friction-head $E'$, and on a counter-shaft G are mounted friction-wheels $G'\,G'$, capable of being slid on the counter-shaft to be brought into contact with the friction-wheel $E'$. Each of the friction-wheels $G'\,G'$ is provided with two grooves $g\,g'$.

The rear axle H of the vehicle is mounted in bearings $h\,h$ on the body of the vehicle, and it has arranged upon it the supporting-wheels $A^3\,A^3$ and the pulleys $H^2\,H^2$. Endless belts or chains I I pass around the pulleys $H^2\,H^2$ and are received by the grooves of the friction-wheels $G'\,G'$.

The supporting-wheels $A^3\,A^3$ are loosely mounted on the axle H and are connected to the same by clutches formed of the block J and indentations in the hubs of the wheels. The blocks are arranged to turn with the axle and are kept normally in contact with the hubs of the wheels by springs $J'$, which bear, respectively, against the body of the vehicle at one end and against one of the blocks at the other end.

Levers K, pivoted in brackets K', projecting from the sides of the body of the vehicle at the sides, have handles $k$ in positions to be grasped by an occupant of the vehicle at one end and at the other end have forks entering grooves in the blocks J. Either or both of the wheels H' H' are thus rendered capable of being quickly detached from the axle.

The direction of movement of the vehicle is regulated by foot-levers L L, mounted on the floor of the vehicle in a convenient position to be depressed by the feet of an occupant. Each lever is connected by a chain $l$ to a bell-crank lever $l'$, having a projection $l^2$, entering the groove $g'$ in one of the friction-wheels. A spring $l^3$ is arranged beneath each lever L and serves to keep the levers in their normal positions when not depressed.

From the construction and arrangement of parts described it will be seen that the vehicle is particularly adapted for use in places where it is required that short turns be made. By pressing one or the other of the levers L, and consequently bringing one or the other of the friction-wheels into contact with the friction-head on the engine-shaft to move the vehicle in the desired direction, and by turning the front wheel to a position at right angles to the body and then disconnecting the proper wheel H' from its axle the vehicle may be caused to turn in a distance corresponding to its length. Longer turns may be made by giving the front less angles to the body of the vehicle.

Having thus described my invention, what I claim as new, and desire to secure by Letters Patent, is—

A vehicle of the kind described comprising an engine having its shaft provided with a friction-head, a shaft having two friction-wheels arranged thereon, on opposite sides of the friction-head, the friction-wheels being capable of sliding toward and away from the friction-head, an axle connected to the shaft, two wheels loosely mounted on the axle, clutches for connecting the wheels to the axle, and levers connected to the clutch and extending to points adjacent to the seat of the vehicle, substantially as described.

In testimony whereof I affix my signature in presence of two witnesses.

REUBEN H. PLASS.

Witnesses:
CHARLES L. FRAILEY,
WILLIAM R. KENNEDY.